United States Patent
Lakic

(10) Patent No.: US 11,834,190 B2
(45) Date of Patent: Dec. 5, 2023

(54) FUEL TANK SYSTEMS AND METHODS FOR VEHICLES

(71) Applicant: THE BOEING COMPANY, Chicago, IL (US)

(72) Inventor: Branko Lakic, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 53 days.

(21) Appl. No.: 17/499,008

(22) Filed: Oct. 12, 2021

(65) Prior Publication Data

US 2023/0116351 A1    Apr. 13, 2023

(51) Int. Cl.
*B64D 37/06* (2006.01)
*B05D 7/00* (2006.01)

(52) U.S. Cl.
CPC .............. *B64D 37/06* (2013.01); *B05D 7/58* (2013.01); *B05D 2506/15* (2013.01); *B05D 2518/00* (2013.01); *B05D 2701/00* (2013.01)

(58) Field of Classification Search
CPC .................... B64D 37/02; B64D 37/06; B60K 2015/03046
See application file for complete search history.

(56) References Cited

U.S. PATENT DOCUMENTS

| | | | | |
|---|---|---|---|---|
| 3,750,730 A * | 8/1973 | Dorsch | ................ | B64D 37/005 285/200 |
| 5,129,544 A * | 7/1992 | Jacobson | ............ | B29C 66/1312 428/35.8 |
| RE34,203 E * | 3/1993 | Palazzo | | |
| 5,467,889 A * | 11/1995 | Ashton | ................. | B29C 53/824 428/36.2 |
| 5,720,404 A * | 2/1998 | Berg | ................. | B29D 99/0014 405/53 |
| 2015/0122939 A1* | 5/2015 | Bistuer | ................. | B64D 37/04 244/17.11 |
| 2021/0163117 A1* | 6/2021 | Huber | .................. | B64C 1/1415 |

FOREIGN PATENT DOCUMENTS

| | | |
|---|---|---|
| DE | 3049429 | 7/1982 |
| EP | 0131533 | 1/1985 |
| EP | 3546207 | 10/2019 |
| FR | 2495545 | 6/1982 |
| WO | WO 2006015456 | 2/2006 |
| WO | WO 2021/186436 | 9/2021 |

OTHER PUBLICATIONS https://www.easa.europa.eu/sites/default/files/dfu/sc-d25.856-01_issue-01_-_for_consultation.pdf.
Extended European Search Report for EP App. No. 22200907.8-1004, dated Feb. 15, 2023.

* cited by examiner

*Primary Examiner* — Stephen J Castellano
(74) *Attorney, Agent, or Firm* — The Small Patent Law Group LLC; Joseph M. Butscher

(57) ABSTRACT

A vehicle including a fuselage, and a fuel tank within the fuselage. The fuel tank includes one or more sealant layers disposed over one or more internal surfaces of the fuel tank. In at least one embodiment, a release agent is disposed between the one or more internal surfaces and the one or more sealant layers.

20 Claims, 9 Drawing Sheets

FUEL TANK SYSTEMS AND METHODS FOR VEHICLES

FIELD OF THE DISCLOSURE

Embodiments of the present disclosure generally relate to fuel tank systems and methods for vehicles, such as within fuselages of commercial, military, cargo, or other such aircraft.

BACKGROUND OF THE DISCLOSURE

Commercial aircraft are used to transport passengers between various locations. An aircraft includes one or more fuel tanks. Typically, the fuel tanks are in and/or on wings of the aircraft. As another example, a fuel tank can be in and/or on a tail of the aircraft.

As another option, aircraft have been developed having fuel tanks within a fuselage. The United States Federal Aviation Administration (FAA) has promulgated various regulatory requirements for intra-fuselage fuel tanks. Testing of portions of an aircraft are performed to ensure that the fuel tanks conform to the regulatory requirements.

For example, in the event of an anomalous landing condition, fuel within the fuel tank cannot be spilled, such as during a wheels-up landing, nor can there be flames in the internal cabin. Additionally, the floor deck that supports a passenger seating area must be able to withstand a downward force of 6 g's (that is, 6 times the force of gravity). Also, force exerted on individuals within an internal cabin cannot exceed 14 g's. All of these requirements must be met to meet FAA certification requirements for commercial passenger aircraft.

Notably, a fuselage can be made extremely stiff such that an anomalous condition may not damage a portion of the fuselage in which a fuel tank is located. However, such a stiff fuselage would necessarily transfer forces that exceed 14 g's into individuals therein in the event of an anomalous condition. As such, fuselages have been developed having crumple zones that deform (for example, crumple) in the event of an anomaly. The deformation of the crumple zones absorbs forces during an anomaly, thereby ensuring that the forces exerted into individuals in the event of an anomaly do not exceed 14 g's, for example. However, during an anomaly, as the crumple zone deforms, great care is taken to minimize any risk that the fuel tank can be pierced (such as by crumpled portions of the fuselage), for example, and spill fuel, which violates the aforementioned regulation regarding spilled fuel.

SUMMARY OF THE DISCLOSURE

A need exists for an improved intra-fuselage fuel tank. Further, a need exists for an intra-fuselage fuel tank that is not susceptible to leaking fuel in the event of an anomaly. Also, a need exists for an intra-fuselage fuel tank that conforms to all relevant regulations promulgated by regulatory agencies, such as the FAA.

With those needs in mind, certain embodiments of the present disclosure provide a vehicle, including a fuselage, and a fuel tank within the fuselage. The fuel tank includes one or more sealant layers disposed over one or more internal surfaces of the fuel tank.

In at least one embodiment, the one or more sealant layers are configured to be deposited over the one or more internal surfaces.

In at least one embodiment, the fuel tank further includes a release agent disposed between the one or more internal surfaces and the one or more sealant layers. As an example, the release agent is configured to be deposited over the one or more internal surfaces.

In at least one embodiment, the one or more sealant layers include a first sealant layer disposed over the one or more internal surfaces, and a second sealant layer disposed over the first sealant layer. In at least one embodiment, the fuel tank further includes a first release agent disposed between the one or more internal surfaces and the first sealant layer, and a second release agent disposed between the first sealant layer and the second sealant layer.

In at least one example, at least a portion of the fuselage forms at least a portion of the fuel tank. In at least one other example, the fuel tank is a separate container within the fuselage.

In at least one embodiment, the fuel tank is disposed within a lower lobe of the fuselage below a floor deck. In at least one example, the one or more sealant layers are disposed within a crumple zone of the fuselage.

Certain embodiments of the present disclosure provide a method of forming a fuel tank within a fuselage of a vehicle. The method includes disposing one or more sealant layers over one or more internal surfaces of the fuel tank. In at least one example, said disposing the one or more sealant layers includes spraying the one or more sealant layers over the one or more internal surfaces.

In at least one embodiment, the method also includes disposing a release agent between the one or more internal surfaces and the one or more sealant layers. In at least one example, said disposing the release agent includes spraying the release agent over the one or more internal surfaces.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a fuel tank within a fuselage of an aircraft. The fuel tank includes one or more sealant layers disposed over one or more internal surfaces of the fuel tank. Certain embodiments of the present disclosure provide a multi-layer sprayed sealant boundary that can be used with any structure protected against spilled liquid, such as spilled fuel. In particular, certain embodiments of the present disclosure are configured to be used with aircraft having fuselage body fuel tanks, such as can be disposed in cargo holds area, which may be the lowest structure of the fuselage.

Figure 1:
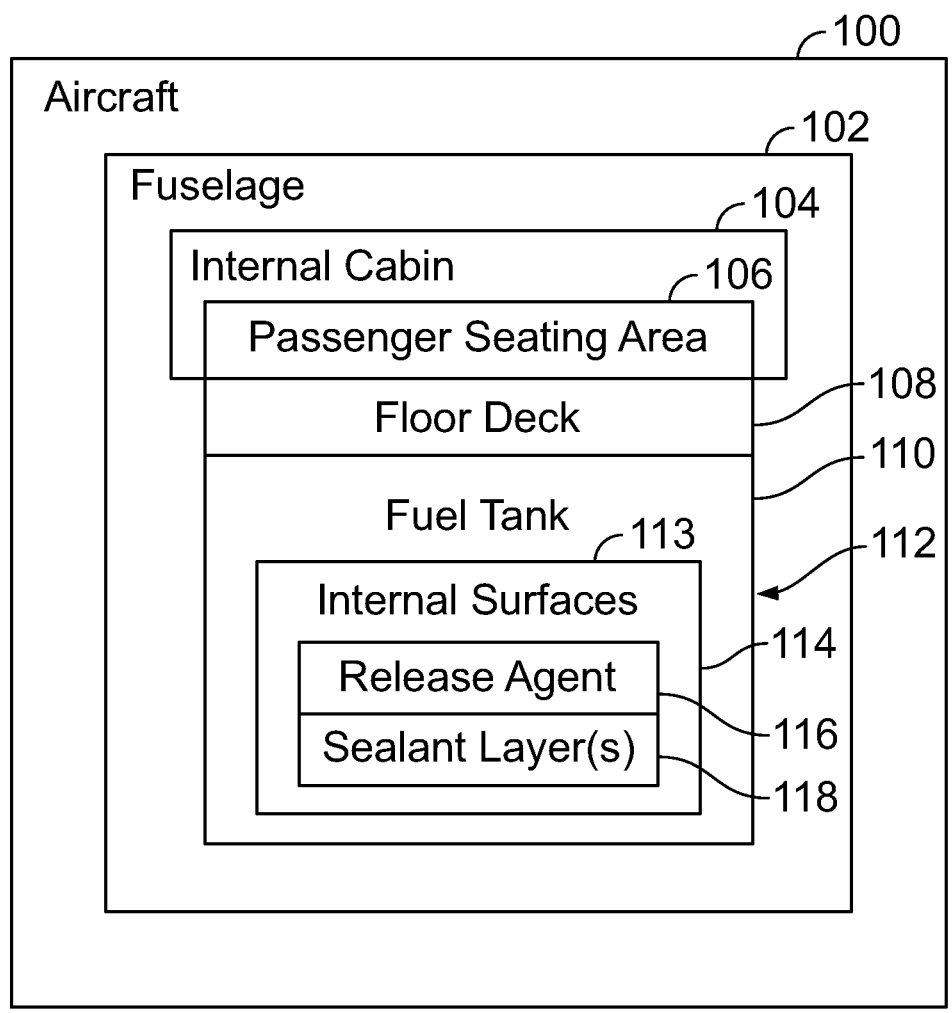
FIG. 1 illustrates a schematic block diagram of an aircraft, according to an embodiment of the present disclosure.

FIG. 1 illustrates a schematic block diagram of an aircraft 100, according to an embodiment of the present disclosure. The aircraft 100 includes a fuselage 102. An internal cabin 104 is within the fuselage 102. The internal cabin 104 includes a passenger seating area 106, which is supported on and over a floor deck 108. In at least one example, the floor deck 108 includes one or more passenger floors over a lower lobe floor. As a further example, the floor deck 108 can include a cargo floor below the passenger floor(s).

The aircraft 100 includes a fuel tank 110 within the fuselage 102. That is, the fuel tank 110 is an intra-fuselage fuel tank. The fuel tank 110 can be integrally formed with the fuselage 102. For example, at least a portion of the fuselage 102 defines at least a portion of the fuel tank 110. As a further example, at least a portion of a skin of the fuselage 102 forms at least a portion of the fuel tank 110. As another example, the fuel tank 110 can be a separate container within the fuselage 102.

The fuel tank 110 is within a lower lobe 112 of the fuselage 102. In particular, the fuel tank 110 is below the floor deck 108. The fuel tank 110 includes a container 113 having internal surface 114. The fuel tank 110 is configured to store fuel within the container 113.

In at least one example, the lower lobe 112, from fore-to-aft, includes a front cargo area, a wing box area, a landing gear area, and an aft cargo area. As a further example, the fuel tank 110 is within the aft cargo area.

A release (or parting) agent 116 is applied to at least a portion of the internal surface 114. Examples of the release agent 116 include Teflon coatings, wax, polyvinyl alcohol (PVA), and/or the like. The release agent 116 can be deposited, such as sprayed, on one or more of the internal surfaces 114. The release agent 116 is applied on the internal surface 114 before one or more sealant layers 118. When multiple sealant layers 118 are used, release agent 116 can also be applied between the multiple sealant layers 118.

As an example, the sealant layer(s) 118 can be or otherwise include a spray-on polymer liner. The sealant layer(s) 118 are configured to meet requirements for fuel tank use. The sealant layer(s) 118 can be one or more thermoplastics. The sealant layer(s) 118 can be configured to be sprayed on to surfaces. Examples of sealants used for the sealant layer(s) 118 include polyether ether ketone (PEEK), polyether ketone ketone (PEKK), polyester elastomer, polyamide, and/or the like. The one or more sealant layers 118 are applied over the release agent 116. For example, the sealant layer(s) 118 can be deposited over the release agent 116. As such, the release agent is disposed between the internal surfaces 114 and the one or more sealant layers 118. Alternatively, the fuel tank 110 may not include the release agent 116.

In at least one embodiment, multiple sealant layers 118 are applied over one or more release agents 116. For example, a first release agent 116 is disposed between an internal surface 114 of the fuel tank, and a first sealant layer 118. A second release agent 116 is disposed between the first sealant layer 118, and a second sealant layer 118, and so on.

In the event of an impact (such as during a test to determine compliance with FAA regulations), the sealant layer(s) 118 are configured to separate (for example, disbond) from the internal surface(s) 114, and act as an elastic bladder or barrier to prevent fuel leakage. Multiple sealant layers 118 ensure fuel containment in case one of the layers becomes compromised. The release agent 116 between the sealant layers 118 and the internal surfaces 114, and/or other sealant layers 118 ensures that the sealant layers 118 separate from each other and from the internal surfaces 114 of the fuel tank 110 to create multiple fuel containment barriers. In at least one embodiment, the sealant layer(s) 118 may not extend higher than an expected crumple zone, such as to a height where stanchions attach to fuselage frames, for example. As such, the sealant layer(s) 118 can be contained within the crumple zone, and thereby not extend past the crumple zone.

As a further example, the inboard-most position of the stanchions is typically determined by a width of cargo containers (such as with the fuel tank 110 is within an aft cargo area). The outboard-most position of the stanchions is set such to increase remaining cargo volume for systems routing. As such, a crumple zone can be above the water line where stanchions are attached to frame. In such settings, the stanchions can be configured with local crumple zones such that the stanchions are configured to collapse.

Embodiments of the present disclosure provide an integral fuselage lower lobe fuel tank 110 that prevents fuel from spilling under an anomalous landing condition, and at the same time meet anomalous landing condition worthiness requirements, such as promulgated by the FAA. For example, embodiments of the present disclosure solve the problem of being able to store fuel in a lower lobe area of a commercial airliner while also meeting FAA requirements for passenger deceleration and retention of fuel in certain structural load conditions.

In at least one embodiment, the sealant layer(s) 118 are disposed on a portion of the fuel tank 110, such as within a limited fuselage lower lobe area, which is configured to significantly deform in the anomalous landing condition. Alternatively, the sealant layer(s) 118 can be disposed over all the internal surfaces 114 of the fuel tank 110.

As shown in FIG. 1, the fuel tank 110 is within an aircraft 100. Optionally, the fuel tank 110 can be used with various other vehicles, such as automobiles, locomotives, spacecraft, seacraft, and/or the like.

As described herein, a vehicle, such as the aircraft 100, includes the fuselage 102, and the fuel tank 110 within the fuselage 102. The fuel tank 110 includes one or more sealant layers 118 disposed over one or more internal surfaces 114 of the fuel tank 110. In at least one embodiment, a release agent 116 is disposed between the one or more internal surfaces 114 and the one or more sealant layers 118.

In at least one embodiment, the one or more sealant layers include a first sealant layer 118*a* (shown in FIGS. 8-12, for example) disposed over the one or more internal surfaces 114, and a second sealant layer 118*b* (shown in FIGS. 8-12, for example) disposed over the first sealant layer 118*a*. As a further example, a first release agent 116*a* (shown in FIGS. 8-12, for example) is disposed between the one or more internal surfaces 114 and the first sealant layer 118*a*, and a second release agent 116*b* (show in FIGS. 8-12, for example) is disposed between the first sealant layer 118*a* and the second sealant layer 118*b*.

In at least one embodiment, the one or more sealant layers 118 are configured to be deposited, such as sprayed, over the one or more internal surfaces 114. In at least one embodiment, the release agent is configured to be deposited, such as sprayed, onto or otherwise over the one or more internal surfaces 114 (and/or between multiple sealant layers 118).

Figure 2:
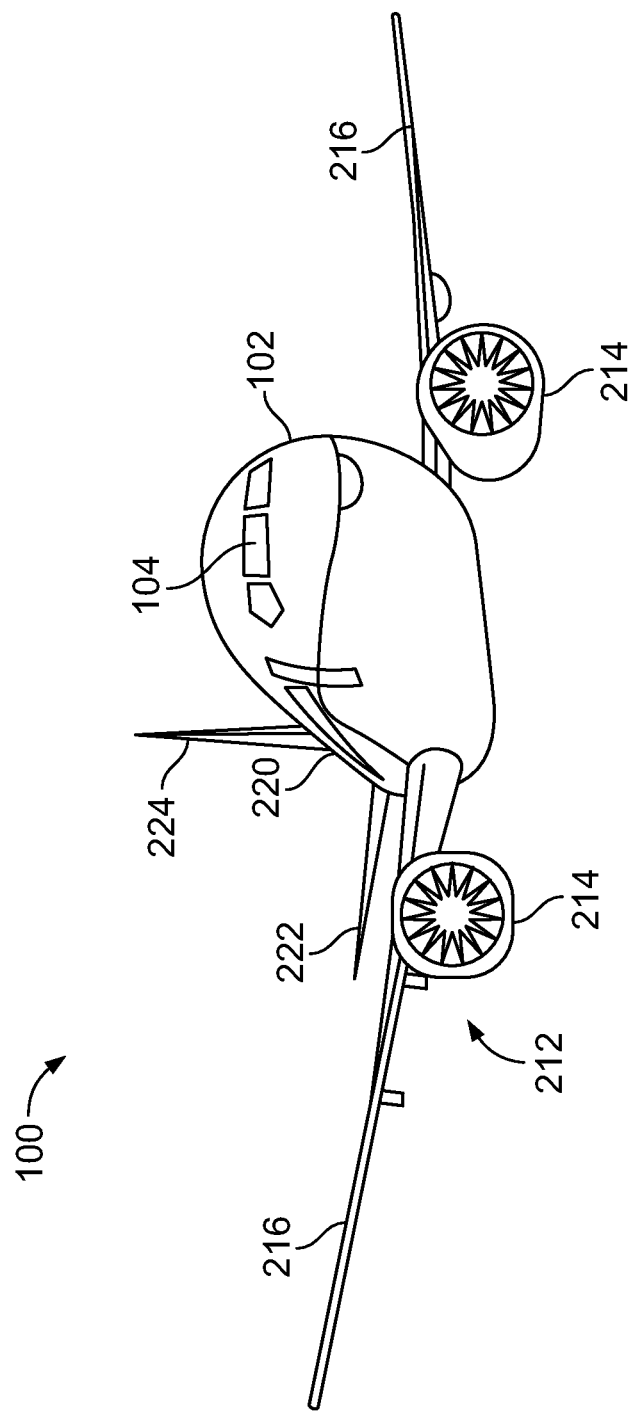
FIG. 2 illustrates a perspective front view of an aircraft, according to an embodiment of the present disclosure.

FIG. 2 illustrates a perspective front view of an aircraft 100, according to an embodiment of the present disclosure. The aircraft 100 includes a propulsion system 212 that includes engines 214, for example. Optionally, the propulsion system 212 may include more engines 214 than shown. The engines 214 are carried by wings 216 of the aircraft 100. In other embodiments, the engines 214 may be carried by a fuselage 102 and/or an empennage 220. The empennage 220 may also support horizontal stabilizers 222 and a vertical stabilizer 224.

The fuselage 102 of the aircraft 100 includes an internal cabin 104, which includes a flight deck or cockpit, one or more work sections (for example, galleys, personnel carry-on baggage areas, and the like), one or more passenger sections (for example, first class, business class, and coach sections), one or more lavatories, and/or the like. The fuel tank 110, shown in FIG. 1, is disposed within a portion of the fuselage 102, such as below a passenger floor of the internal cabin 104, as described with respect to FIG. 1.

The aircraft 100 shown and described in FIG. 2 is merely exemplary. The aircraft 100 can be sized and shaped differently than shown in FIG. 2. Further, the aircraft 100 can include less or more components than shown in FIG. 2.

Figure 3:
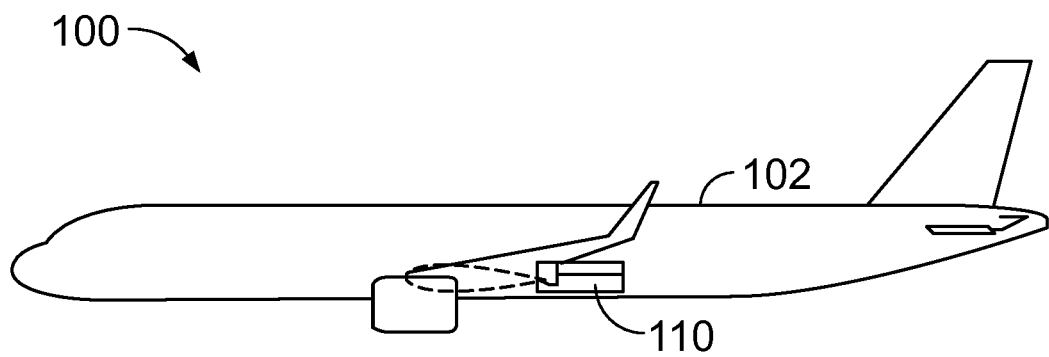
FIG. 3 illustrates a side view of an aircraft, according to an embodiment of the present disclosure.
Figure 4:
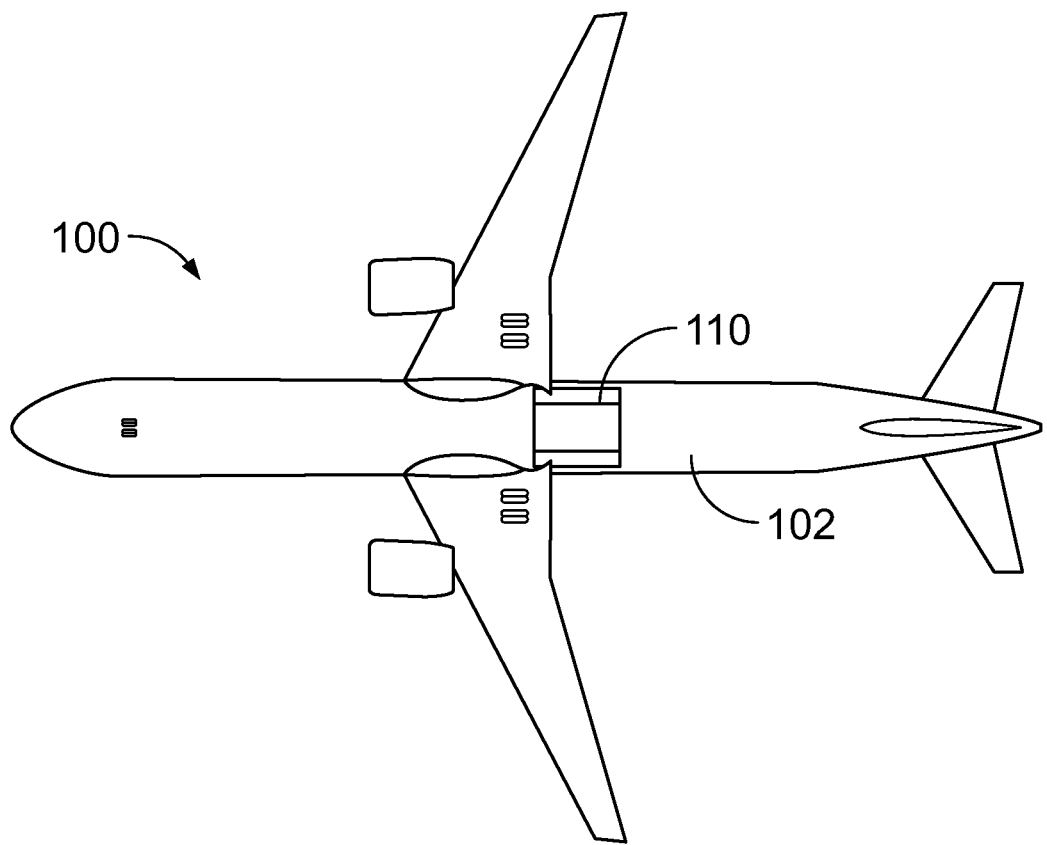
FIG. 4 illustrates a top view of the aircraft of FIG. 3.

FIG. 3 illustrates a side view of an aircraft 100, according to an embodiment of the present disclosure. FIG. 4 illustrates a top view of the aircraft 100 of FIG. 3. Referring to FIGS. 3 and 4, a portion of the fuselage 102 is shown transparent to show a location of the fuel tank 110. The fuel tank 110 is within the fuselage 102, such as a lower lobe portion below the floor deck 108 (shown in FIG. 1).

Figure 5:
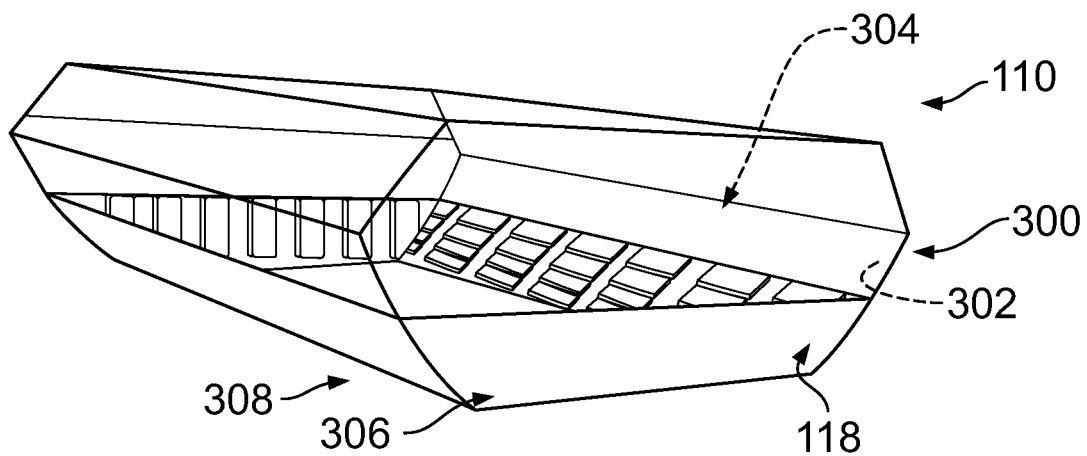
FIG. 5 illustrates a perspective internal view of a fuel tank, according to an embodiment of the present disclosure.

FIG. 5 illustrates a perspective internal view of a fuel tank 110, according to an embodiment of the present disclosure. The fuel tank 110 includes a main body 300 having outer walls opposite from internal surfaces 302 that define an internal retaining chamber 304. The internal surfaces 302 are examples of the internal surfaces 114 shown in FIG. 1. One or more sealant layers 118 are disposed within the internal retaining chamber 304 over the internal surfaces 302. As noted, one or more release agents 116 can be disposed between the sealant layer(s) 118 and the internal surfaces 302, and/or between multiple sealant layers 118.

The sealant layers 118 provide a liquid-tight retaining basin 306, which prevents liquids, such as fuel, from passing therethrough. As shown, the sealant layer(s) 118 is disposed at a bottom portion 308 of the fuel tank 110.

Figure 6:
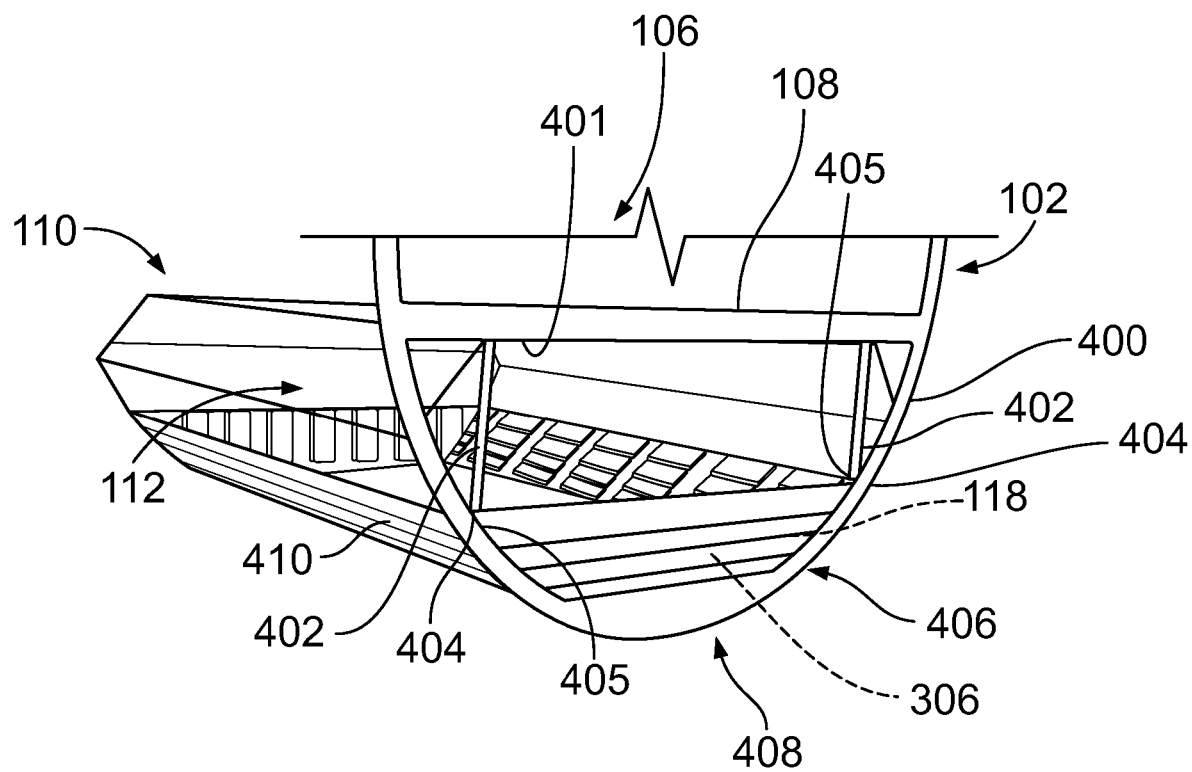
FIG. 6 illustrates a perspective internal view of the fuel tank of FIG. 5 in relation to an axial cross-section of a lower lobe of a fuselage section, according to an embodiment of the present disclosure.

FIG. 6 illustrates a perspective internal view of the fuel tank 110 of FIG. 5 in relation to an axial cross-section of a lower lobe of a fuselage section, according to an embodiment of the present disclosure. The fuel tank 110 is disposed within the lower lobe 112 of the fuselage 102, below the floor deck 108 that supports the passenger seating area 106. The lower lobe 112 includes an outer wall 400 (which may include one or more skins) that extend to lower surfaces 401 of the floor deck 108 (for example, the passenger floor deck). One or more supports 402 (such as stanchions) extend between the lower surfaces 401 and internal lateral surfaces 405 of the outer wall 400. A crumple zone 406 is defined from lower portions 405 of the supports 402 and a bottom 408 of the lower lobe 112. At least a portion of the crumple zone 406 is configured to deform (such as crumple) in the event of an anomaly, while the supports 402 and the floor deck 108 remain intact (that is, do not deform).

As shown, the sealant layer(s) 118 which define the retaining basin 306 may be disposed within the crumple zone 406. The sealant layer(s) 118 extend to a height 410 (that is, an upper limit) of the crumple zone 406. The sealant layer(s) 118 may not extend past the height 410. Alternatively, the sealant layer(s) 118 may extend above the height 410.

Referring to FIGS. 5 and 6, in the event of an anomaly, the crumple zone 406 may deform. Upon deformation of the crumple zone 406, the retaining basin 306 defined by the one or more sealant layers 118 separate from the internal surfaces 302 (such as via the release agent 116, shown in FIG. 1), thereby ensuring that the retaining basin 306 is not punctured. As such, the retaining basin 306 can retain fuel, and prevent the fuel from leaking from the fuel tank 110. Additionally, multiple sealant layers 118 may separate from one another (such as via release agent 116 therebetween), to provide multiple, redundant fuel retaining members.

Figure 7:
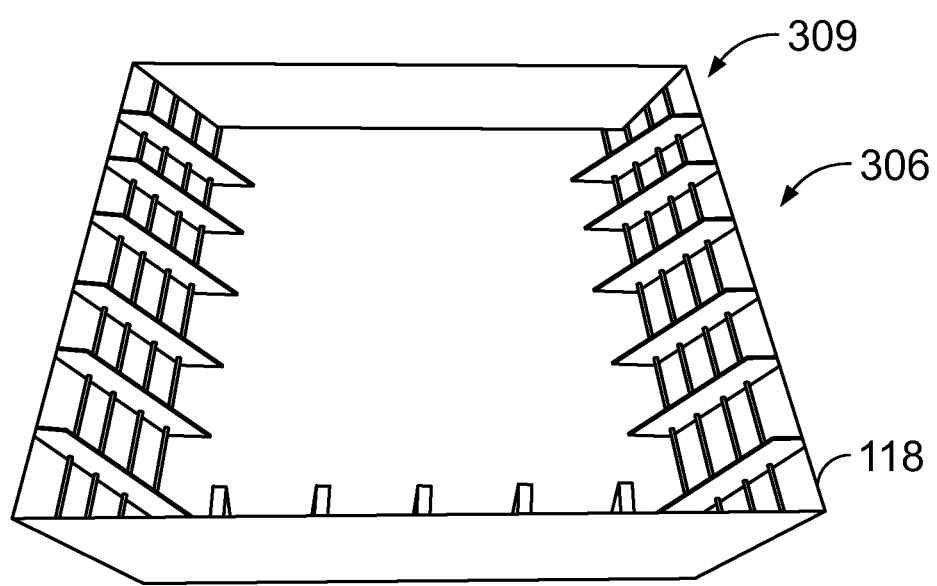
FIG. 7 illustrates a perspective top view of a retaining basin, according to an embodiment of the present disclosure.

FIG. 7 illustrates a perspective top view of the retaining basin 306, according to an embodiment of the present disclosure. As noted, the retaining basin 306 is formed by one or more sealant layers 118. For example, the sealant layers 118 can be sprayed onto internal surfaces of the fuel tank 110 (shown in FIGS. 1-6). As shown, the retaining basin 306 has an open top 309. In at least one embodiment, the retaining basin 306 is not a closed container. Referring to FIGS. 1-7, in at least one embodiment, the fuel tank 110 is a separate container disposed within the fuselage 102. As another example, at least portions of the lower lobe 112 of the fuselage 102 (such as skins) form at least portions of walls of the fuel tank 110.

Figure 8:
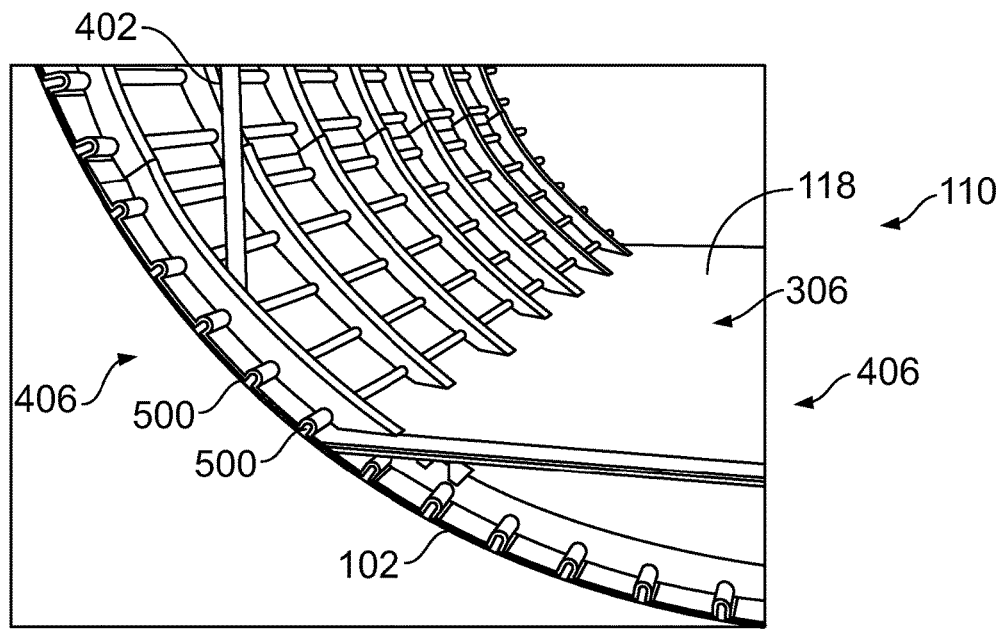
FIG. 8 illustrates a perspective internal view of a fuel tank within a lower lobe of a fuselage of an aircraft, according to an embodiment of the present disclosure.

FIG. 8 illustrates a perspective internal view of the fuel tank 110 within the lower lobe 112 of the fuselage 102 of the aircraft 100, according to an embodiment of the present disclosure. As noted, in at least one embodiment, the retaining basin 306 is formed by multiple sealant layers 118. The sealant layers 118 are disposed over internal portions of the fuselage 102, such as can include stringers 500, which extend over a length of the fuselage 102.

Figure 9:
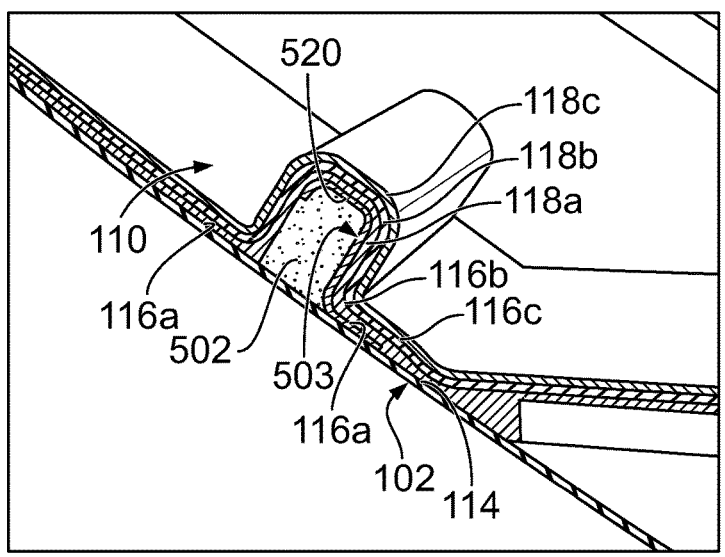
FIG. 9 illustrates a perspective view of multiple sealant layers disposed over a stringer of the fuselage of FIG. 8.
Figure 10:
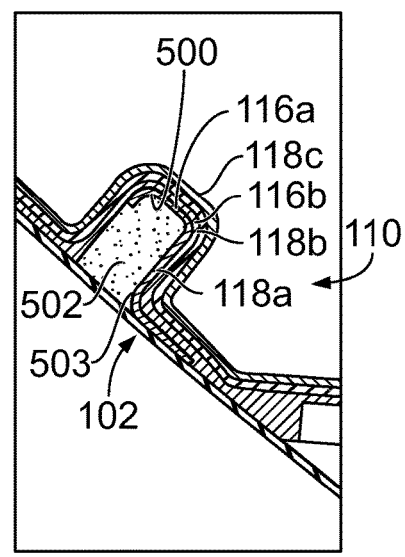
FIG. 10 illustrates a lateral view of the multiple sealant layers disposed over the stringer of the fuselage of FIG. 8.

FIG. 9 illustrates a perspective view of multiple sealant layers 118*a*, 118*b*, and 118*c* disposed over a stringer 500 of the fuselage 102 of FIG. 8. FIG. 10 illustrates a lateral view of the multiple sealant layers 118*a*, 118*b*, and 118*c* disposed over the stringer 500 of the fuselage 102 of FIG. 8. Referring to FIGS. 8-10, a stringer filler 502 can be disposed within internal stringer cavities 503 of the stringers 500 before any release agent or sealant layers are applied over the portions of the fuel tank 110. The stringer filler 502 can be a closed-cell foam, for example. The stringer filler 502 occupies the internal stringer cavities 503 to ensure efficient and effective application of the release agent and the sealant layers.

A first release agent 116a can be first applied over internal surfaces 114 of the fuel tank 110. For example, the first release agent 116a can be applied (such as sprayed) over the internal surfaces 114, such as within the crumple zone 406. After the first release agent 116a is disposed over the internal surfaces 114, the first sealant layer 118a is applied over the first release agent 116a. A second release agent 116b can next be applied over the first sealant layer 118a. Similarly, a third release agent 116c can be disposed between the second sealant layer 118b and the third sealant layer 118c, and so on.

The fuel tank 110 can include more or less release agents 116 (that is layers of release agents 116) and more or less sealant layers 118 than shown. The release agents 116 and sealant layers 118 can be applied through spraying, for example.

Figure 11:
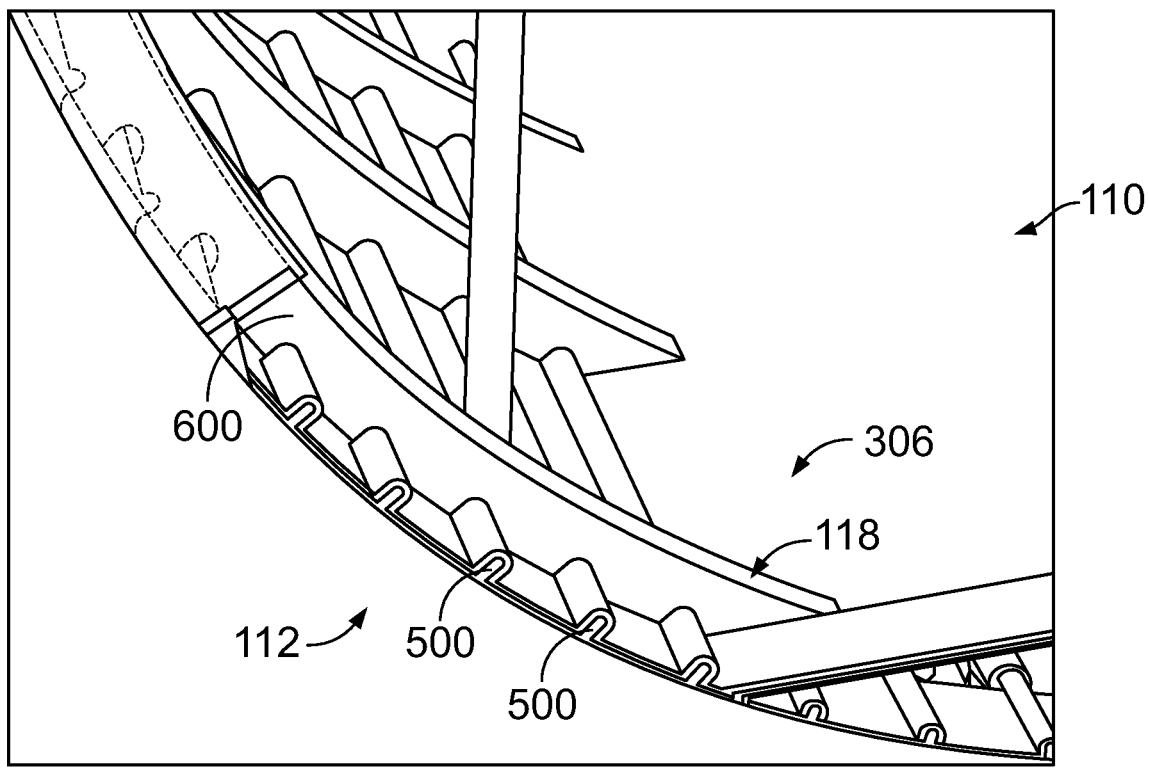
FIG. 11 illustrates a perspective internal view of the fuel tank within the lower lobe of the fuselage of the aircraft, according to an embodiment of the present disclosure.
Figure 12:
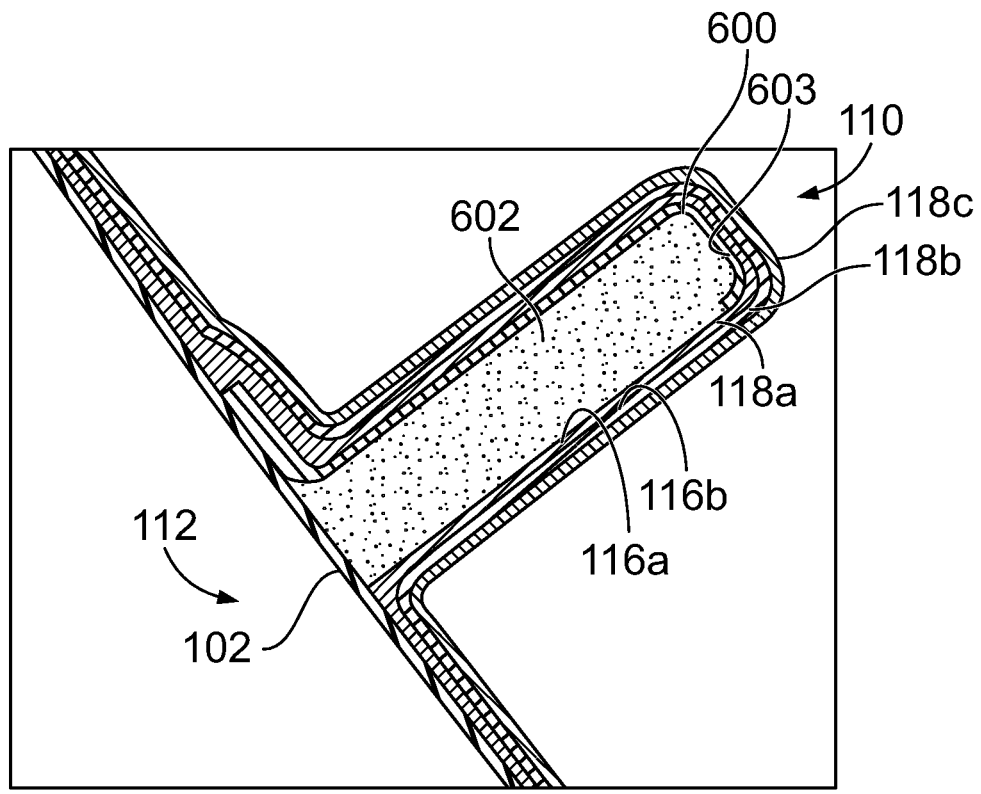
FIG. 12 illustrates a lateral view of multiple sealant layers disposed over a frame of the fuselage of FIG. 11.

FIG. 11 illustrates a perspective internal view of the fuel tank 110 within the lower lobe 112 of the fuselage 102 of the aircraft 100, according to an embodiment of the present disclosure. FIG. 12 illustrates a lateral view of multiple sealant layers 118 disposed over a frame 600 of the fuselage of FIG. 11. Referring to FIGS. 11 and 12, a frame filler 602 can be disposed within internal frame cavities 603 of the frames 600 before any release agent or sealant layers are applied over the portions of the fuel tank 110. The frame filler 602 can be a closed-cell form, for example. The frame filler 602 occupies the internal frame cavities 603 to ensure efficient and effective application of the release agent and the sealant layers. Multiple release agents 116 and multiple sealant layers 118 can be applied over the frames 600, as described with respect to FIGS. 8-10.

Figure 13:
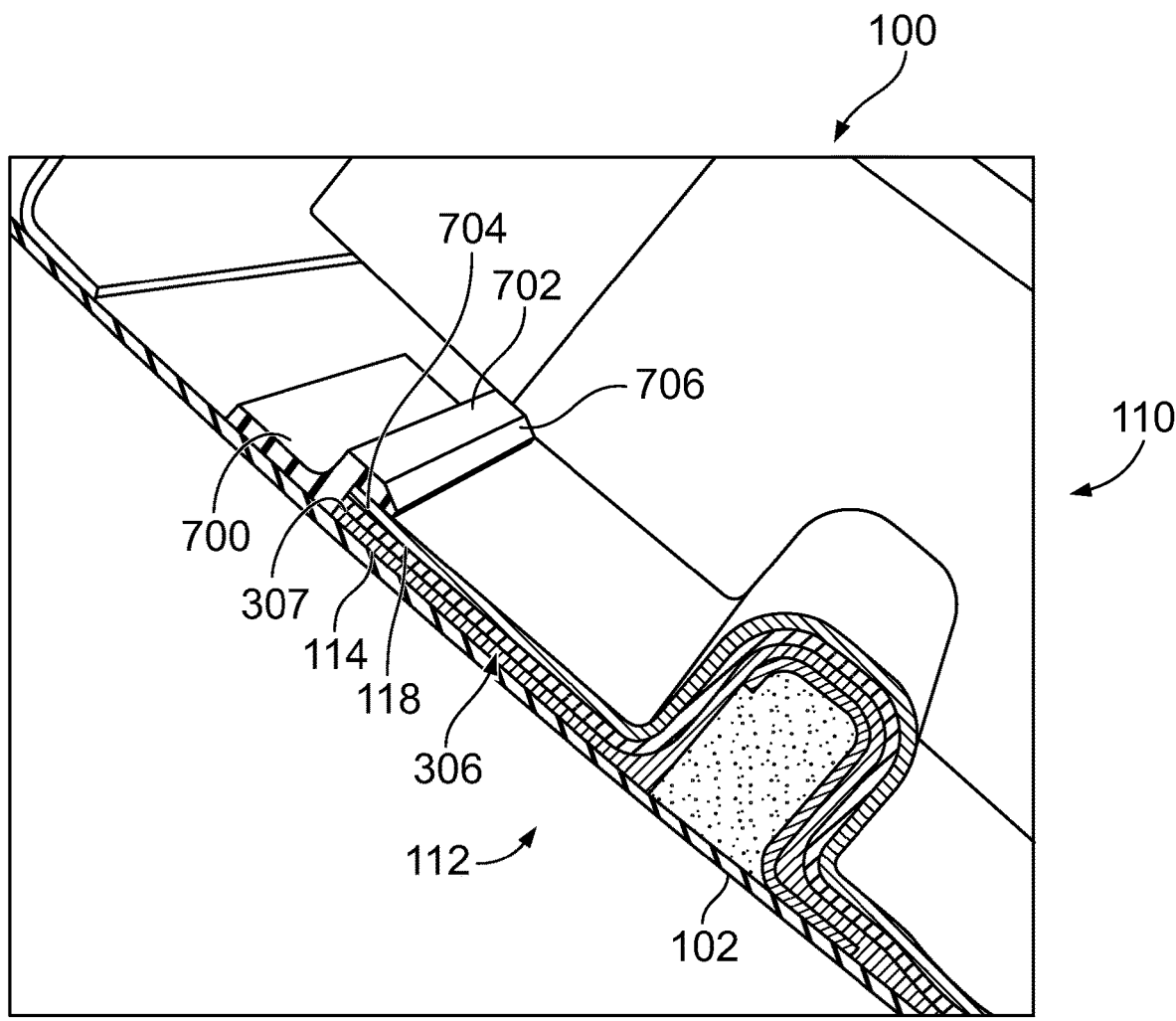
FIG. 13 illustrates a perspective view of a securing member disposed over an upper edge of a retaining basin, according to an embodiment of the present disclosure.

FIG. 13 illustrates a perspective view of a securing member 700 disposed over an upper edge 307 of the retaining basin 306 (defined by the sealant layer(s) 118), according to an embodiment of the present disclosure. The securing member 700 can be a clamp 702, such as formed of an elastomeric material (for example, rubber). The clamp 702 includes a recess 704 into which the upper edge 307 is retained. An upper arm 706 exerts a retaining force into the upper edge 307, thereby securely sandwiching the upper edge 307 between the upper arm 706 and an internal surface 114 of the fuel tank 110. The securing member 700 can be secured to an internal surface 114, such as through mechanical fastening, bonding, adhesives, and/or the like. Securing members 700 can couple to all the upper edges of the retaining basin 306. In at least one embodiment, the arm 706 can be lifted, to expose the upper edge 307, which can then be peeled back, such as during an inspection. Optionally, securing members may not be used.

Figure 14:
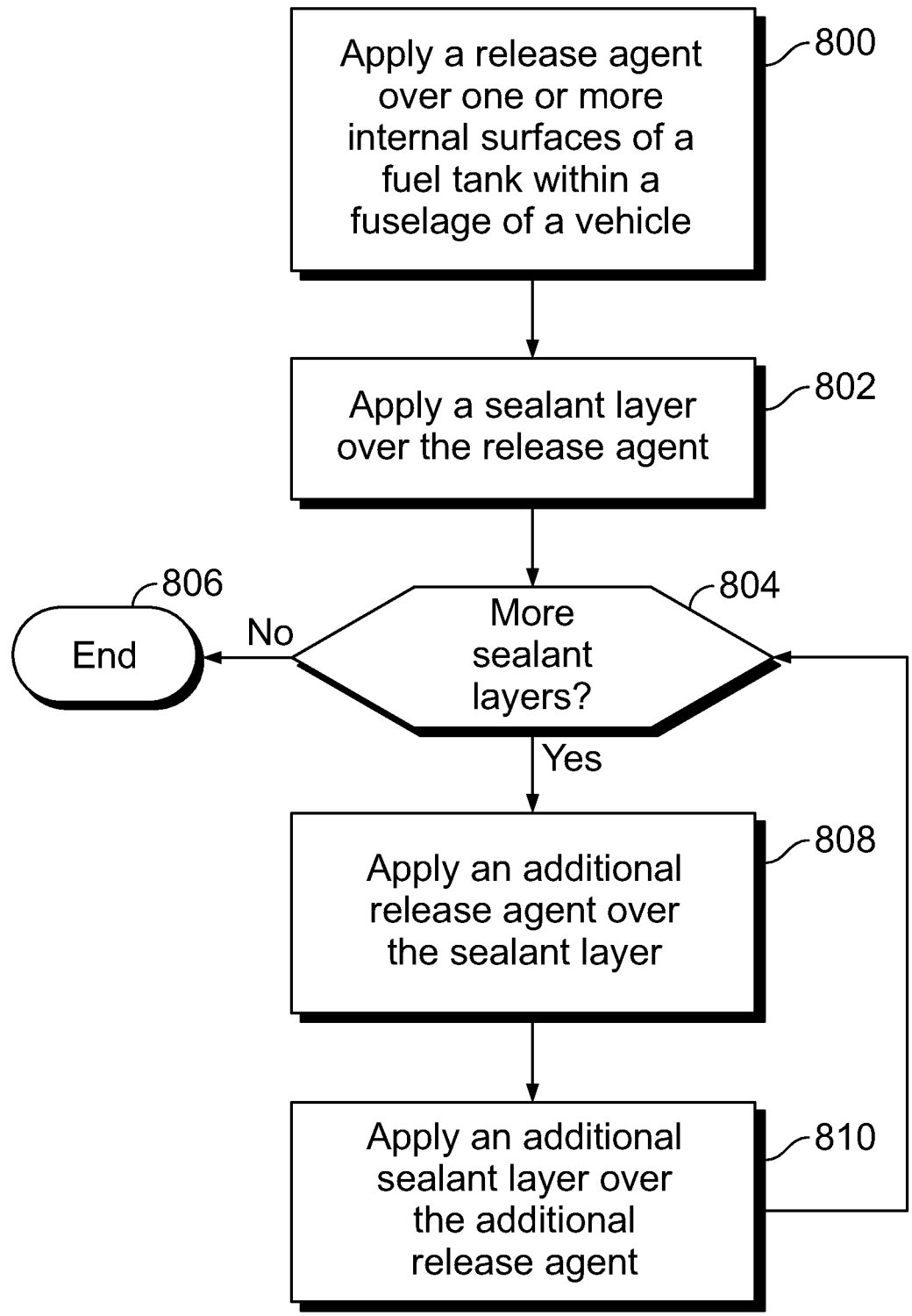
FIG. 14 illustrates a flow chart of a method of forming a fuel tank within a fuselage of a vehicle, according to an embodiment of the present disclosure.

FIG. 14 illustrates a flow chart of a method of forming a fuel tank within a fuselage of a vehicle, according to an embodiment of the present disclosure. Referring to FIGS. 1 and 14, at 800, a release agent 116 is applied (and disposed) over one or more internal surfaces 114 of a fuel tank 110 within a fuselage 102 of a vehicle, such as an aircraft 100. For example, the release agent 116 is sprayed on the one or more internal surfaces 114. The internal surfaces 114 can be portions of the fuselage 102 itself, or a separate container within the fuselage 102.

At 802, a sealant layer 118 is applied (and disposed) over the release agent 116. The release agent 802 is disposed between the sealant layer 118 and the one or more internal surfaces 114. As an example, the sealant layer 118 is deposited over the release agent 116.

At 804, it is determined if more sealant layers 118 are desired. If not, the method proceeds to end at 806.

If, however, more sealant layers 118 are desired, the method proceeds from 804 to 808, at which an additional release agent 116 is applied over the sealant layer 118. Next, at 810, an additional sealant layer 118 is applied over the additional release agent 116. The method then returns to 804.

Further, the disclosure comprises examples according to the following clauses:

Clause 1. A vehicle, comprising:
a fuselage; and
a fuel tank within the fuselage, wherein the fuel tank includes one or more sealant layers disposed over one or more internal surfaces of the fuel tank.

Clause 2. The vehicle of Clause 1, wherein the one or more sealant layers are configured to be deposited over the one or more internal surfaces.

Clause 3. The vehicle of Clauses 1 or 2, wherein the fuel tank further comprises a release agent disposed between the one or more internal surfaces and the one or more sealant layers.

Clause 4. The vehicle of Clause 3, wherein the release agent is configured to be deposited over the one or more internal surfaces.

Clause 5. The vehicle of any of Clauses 1-4, wherein the one or more sealant layers comprise:
a first sealant layer disposed over the one or more internal surfaces; and
a second sealant layer disposed over the first sealant layer.

Clause 6. The vehicle of Clause 5, wherein the fuel tank further comprises:
a first release agent disposed between the one or more internal surfaces and the first sealant layer; and
a second release agent disposed between the first sealant layer and the second sealant layer.

Clause 7. The vehicle of any of Clauses 1-6, wherein at least a portion of the fuselage forms at least a portion of the fuel tank.

Clause 8. The vehicle of any of Clauses 1-6, wherein the fuel tank is a separate container within the fuselage.

Clause 9. The vehicle of any of Clauses 1-8, wherein the fuel tank is disposed within a lower lobe of the fuselage below a floor deck.

Clause 10. The vehicle of any of Clauses 1-9, wherein the one or more sealant layers are disposed within a crumple zone of the fuselage.

Clause 11. A method of forming a fuel tank within a fuselage of a vehicle, the method comprising:
disposing one or more sealant layers over one or more internal surfaces of the fuel tank.

Clause 12. The method of Clause 11, wherein said disposing the one or more sealant layers comprises spraying the one or more sealant layers over the one or more internal surfaces.

Clause 13. The method of Clauses 11 or 12, further comprising disposing a release agent between the one or more internal surfaces and the one or more sealant layers.

Clause 14. The method of Clause 13, wherein said disposing the release agent comprises spraying the release agent over the one or more internal surfaces.

Clause 15. The method of any of Clauses 11-14, wherein said disposing the one or more sealant layers comprises:
disposing a first sealant layer over the one or more internal surfaces; and disposing a second sealant layer over the first sealant layer.

Clause 16. The method of Clause 15, further comprising disposing a first release agent between the one or more internal surfaces and the first sealant layer; and disposing a second release agent between the first sealant layer and the second sealant layer.

Clause 17. The method of any of Clauses 11-16, further comprising forming at least a portion of the fuel tank by at least a portion of the fuselage.

Clause 18. The method of any of Clauses 11-17, further comprising disposing the fuel tank within a lower lobe of the fuselage below a floor deck.

Clause 19. The method of any of Clauses 11-18, further comprising disposing the one or more sealant layers within a crumple zone of the fuselage.

Clause 20. A vehicle, comprising:
a fuselage; and
a fuel tank within the fuselage, wherein at least a portion of the fuselage forms at least a portion of the fuel tank, wherein the fuel tank is disposed within a lower lobe of the fuselage below a floor deck, and wherein the fuel tank comprises:
  a first sealant layer disposed over the one or more internal surfaces, wherein the first sealant layer is configured to be deposited over the one or more internal surfaces, wherein the first sealant layer is disposed within a crumple zone of the fuselage;
  a second sealant layer disposed over the first sealant layer, wherein the second sealant layer is configured to be deposited over the first sealant layer, wherein the second sealant layer is disposed within a crumple zone of the fuselage;
  a first release agent disposed between the one or more internal surfaces and the first sealant layer, wherein the first release agent is configured to be sprayed onto the one or more internal surfaces; and
  a second release agent disposed between the first sealant layer and the second sealant layer, wherein the second release agent is configured to be sprayed onto the first sealant layer.

As described herein, embodiments of the present disclosure provide improved intra-fuselage fuel tanks and methods of forming the same. Further, embodiments of the present disclosure provide intra-fuselage fuel tanks that are not susceptible to leaking fuel in the event of an anomaly. Also, embodiments of the present disclosure provide intra-fuselage fuel tanks that conform to all relevant regulations promulgated by regulatory agencies, such as the FAA.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle, comprising:
a fuselage; and
a fuel tank enclosed within the fuselage, wherein the fuel tank includes a first sealant layer disposed over one or more internal surfaces of the fuel tank, wherein the fuel tank includes a main body having outer walls opposite form the one or more internal surfaces, wherein the first sealant layer is disposed at a bottom portion of the fuel tank, and wherein a liquid-tight retaining basin includes the first sealant layer; and
one or more clamps disposed over one or more upper edges of the liquid-tight retaining basin.

2. The vehicle of claim 1, wherein the first sealant layer is configured to be deposited over the one or more internal surfaces.

3. The vehicle of claim 1, wherein the fuel tank further comprises a first release agent disposed between the one or more internal surfaces and the first sealant layer.

4. The vehicle of claim 3, wherein the first release agent is configured to be deposited over the one or more internal surfaces.

5. The vehicle of claim 1, wherein the fuel tank further comprises a second sealant layer disposed over the first sealant layer.

6. The vehicle of claim 5, wherein the fuel tank further comprises a second release agent disposed between the first sealant layer and the second sealant layer.

7. A vehicle, comprising:
a fuselage; and
a fuel tank enclosed within the fuselage, wherein the fuel tank is disposed within a lower lobe of the fuselage below a floor deck that supports a passenger seating area, wherein the lower lobe includes an outer wall that extends to lower surfaces of the floor deck, wherein one or more supports extend between the lower surfaces of the floor deck and internal lateral surfaces of the outer wall of the lower lobe, wherein a crumple zone is defined from lower portions of the one or more supports and a bottom of the lower lobe, wherein the fuel tank includes a first sealant layer disposed over one or more internal surfaces of the fuel tank, wherein the fuel tank includes a main body having outer walls opposite from the one or more internal surfaces, wherein the first sealant layer is disposed at a bottom portion of the fuel tank, wherein a liquid-tight retaining basin includes the first sealant layer, and wherein the liquid-tight retaining basin is disposed within the crumple zone.

8. The vehicle of claim 7, wherein the first sealant layer is configured to be deposited over the one or more internal surfaces.

9. The vehicle of claim 7, wherein the fuel tank further comprises a first release agent disposed between the one or more internal surfaces and the first sealant layer.

10. The vehicle of claim 9, wherein the first release agent is configured to be deposited over the one or more internal surfaces.

11. The vehicle of claim 7, wherein the fuel tank further comprises a second sealant layer disposed over the first sealant layer.

12. The vehicle of claim 11, wherein the fuel tank further comprises a second release agent disposed between the first sealant layer and the second sealant layer.

13. The vehicle of claim 7, wherein the fuel tank is a separate container within the fuselage.

14. The vehicle of claim 7, wherein the first sealant layer is disposed within the crumple zone of the fuselage.

15. The vehicle of claim 7, wherein the liquid-tight retaining basin extends to an upper limit of the crumple zone.

16. The vehicle of claim 7, wherein the liquid-tight retaining basin has an open top.

17. The vehicle of claim 7, wherein the liquid-tight retaining basin is not a closed container.

18. The vehicle of claim 7, further comprising one or more clamps disposed over one or more upper edges of the liquid-tight retaining basin.

19. A vehicle, comprising:
a fuselage; and
a fuel tank enclosed within a lower lobe of the fuselage below a floor deck, wherein the lower lobe includes an outer wall that extends to lower surfaces of a floor deck, wherein one or more supports extend between the lower surfaces of the floor deck and internal lateral surfaces of an outer wall of the lower lobe, and wherein a crumple zone is defined from the lower portions of the one or more supports and a bottom of the lower lobe, and wherein the fuel tank comprises:
a main body having outer walls opposite from one or more internal surfaces;
a first sealant layer disposed over the one or more internal surfaces of the fuel tank, wherein the first sealant layer is configured to be deposited over the one or more internal surfaces, wherein the first sealant layer is disposed within the crumple zone of the fuselage;
a second sealant layer disposed over the first sealant layer, wherein the second sealant layer is configured to be deposited over the first sealant layer, wherein the second sealant layer is disposed within the crumple zone of the fuselage;
a first release agent disposed between the one or more internal surfaces and the first sealant layer, wherein the first release agent is configured to be sprayed onto the one or more internal surfaces; and
a second release agent disposed between the first sealant layer and the second sealant layer, wherein the second release agent is configured to be sprayed onto the first sealant layer,
wherein the first sealant layer, the second sealant layer, and first release agent, and the second release agent are disposed at a bottom portion of the fuel tank, and provide a liquid-tight retaining basin, that extends to an upper limit of the crumple zone.

20. The vehicle of claim 19, wherein the liquid-tight retaining basin has an open top, and wherein the liquid-tight retaining basin is not a closed container.

* * * * *